Aug. 27, 1963      L. C. OWERS      3,102,186
ELECTRIC BLANKETS
Filed June 15, 1961
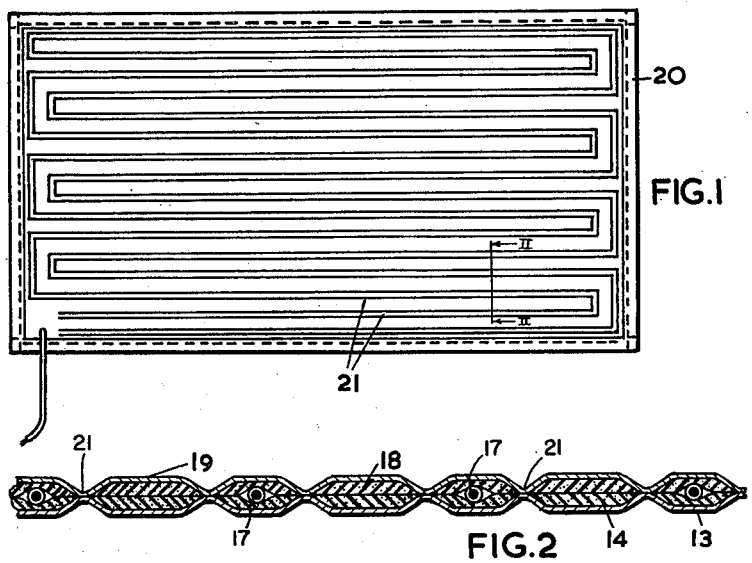
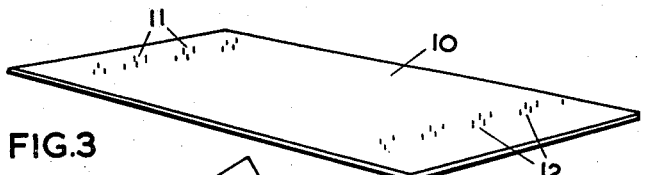
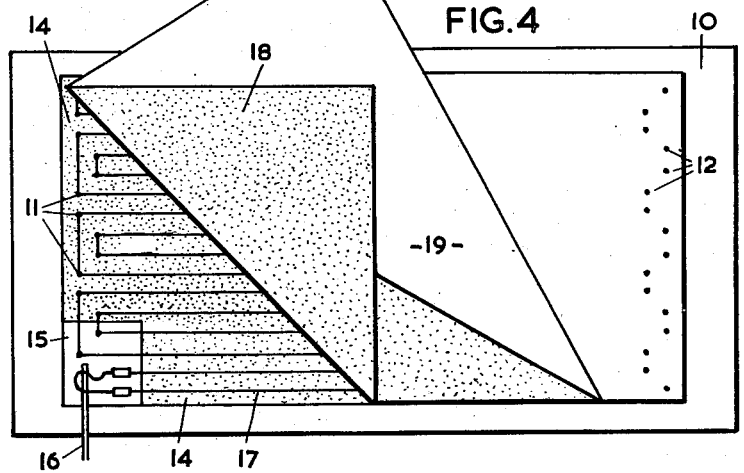
INVENTOR
L. C. Owers
ATTORNEYS 3,102,186
ELECTRIC BLANKETS
Leonard Charles Owers, Colbury, near Totton, England, assignor to Dreamland Electrical Appliances Limited, a British company
Filed June 15, 1961, Ser. No. 117,388
Claims priority, application Great Britain July 8, 1960
3 Claims. (Cl. 219—46)

This invention relates to electric blankets.

It is an object of the present invention to provide a blanket having an orthodox textile exterior which can be rucked or folded without involving the danger that portions of the heating element will come into such close proximity as to cause local overheating. In the present invention this is accomplished by sandwiching the heating element between two pads of thermoplastic material and connecting said pads along spaced lines by welds so that the padding between the welds holds the strands of the heating element in correct spaced relationship.

In the accompanying drawings which illustrate how the invention may be carried into effect:

FIG. 1 is a plan view of a finished blanket made in accordance with the invention.

FIG. 2 is an enlarged cross section taken on the line II—II, FIG. 1.

FIG. 3 illustrates a jig on which the various layers of the blanket may be assembled during the course of manufacture, and FIG. 4 illustrates the assembly of the various layers of the blanket prior to the welding operation.

Referring first to FIG. 3 this figure shows a jig comprising a rectangular aluminium plate 10 having a thickness of approximately 3/16″ and having adjacent each end a plurality of steel pointed pins 11, 12.

The various layers of the blanket and the heating element are assembled on this jig in the following sequence. An outer or covering layer 13 of fabric is first placed on the jig with the pins 11, 12 passing through the layer, and a layer 14 of polyvinyl chloride wadding or foam is then similarly placed on the covering material 13 with the pins 11, 12 passing through this layer 14. A canvas square 15 holding the mains lead 16 is placed in position and conducting wire 17 is then wound around the pins 11, 12 to form the heating element which is connected to the mains lead 16. A second layer 18 of polyvinyl chloride wadding or foam and a second outer or covering layer 19 of fabric are then successively placed on the exposed side of the heating element 17, the whole assembly being held in place on the aluminium plate by the pins 11, 12. When the assembly has thus been completed the various layers of the assembly are welded or fused together by means of a high frequency electronic or other suitable welding machine, along a plurality of lines 21 to form the "quilting" lines above referred to.

This welding operation produces fusion of the two thermoplastic layers along the weld lines and causes the layers to be bonded together and to the fibres of the outer covering layers whereby all the layers of the assembly are joined together along the weld lines.

The quilting lines 21 are disposed between the runs of the wire 17 in such a way that the wire 17 is positively positioned.

A satin binding tape 20 may be sewn around the edges of the assembly, if required.

The fabric covering material 13, 19 in the above embodiment may be cotton, cotton/rayon mixture or wool mixture.

Blankets made in accordance with the invention have the advantage that they reduce to a safe level local overheating caused when an electric blanket containing a ruck or fold is in use (i.e. connected to the supply), because at the ruck or fold parts of the element wire 17 are prevented from coming into close proximity to one another by reason of the thicknesses of the layers 14, 18 of synthetic plastic foam or wadding, and the innumerable air spaces therein, in addition to the fabric covering material.

What I claim and desire to secure by Letters Patent is:

1. An electrically heated blanket comprising two inner resilient, readily compressible pads of synthetic plastics material, a heating element consisting of conductor wire laid in reversing lines spaced in substantially parallel relationship and interposed between and embedded in said two pads of material so as to be held against substantial shifting relative thereto, and two outer layers of fabric covering respectively the outer surfaces of said inner pads, said inner pads being bonded together and to the fibres of the outer fabric covering layers by welding along lines disposed between the lines of the conducting wire.

2. An electrically heated blanket according to claim 1 in which the inner pads comprise polyvinyl chloride foam material.

3. An electrically heated blanket according to claim 1 in which the inner pads comprise polyvinyl chloride wadding.

References Cited in the file of this patent

UNITED STATES PATENTS

| | | |
|---|---|---|
| 1,376,987 | Wirt | May 3, 1921 |
| 1,994,759 | Dermott | Mar. 19, 1935 |
| 2,621,139 | Messing | Dec. 9, 1952 |
| 2,715,674 | Abbott et al. | Aug. 16, 1955 |
| 2,719,213 | Johnson | Sept. 27, 1955 |
| 2,741,692 | Luke | Apr. 10, 1956 |
| 2,862,097 | Negromanti | Nov. 25, 1958 |
| 2,873,352 | Franco | Feb. 10, 1959 |
| 2,942,330 | Luke | June 28, 1960 |
| 2,962,406 | Rosa | Nov. 29, 1960 |
| 2,990,607 | Negromanti | July 4, 1961 |
| 3,015,016 | Cole | Dec. 26, 1961 |
| 3,049,456 | Goldstone | Aug. 14, 1962 |

FOREIGN PATENTS

| | | |
|---|---|---|
| 476,121 | Italy | Mar. 22, 1951 |
| 701,304 | Great Britain | Dec. 23, 1953 |